United States Patent
Ohashi et al.

(10) Patent No.: US 12,071,145 B2
(45) Date of Patent: Aug. 27, 2024

(54) CONTROL DEVICE FOR VEHICLE, MANAGER, METHOD, NON-TRANSITORY STORAGE MEDIUM, AND VEHICLE

(71) Applicants: TOYOTA JIDOSHA KABUSHIKI KAISHA, Toyota (JP); ADVICS CO., LTD., Kariya (JP)

(72) Inventors: Hideki Ohashi, Chiryu (JP); Wataru Kanda, Nisshin (JP); Tatsuya Hasegawa, Nagoya (JP); Shota Higashi, Tokyo (JP)

(73) Assignees: TOYOTA JIDOSHA KABUSHIKI KAISHA, Toyota (JP); ADVICS CO., LTD., Kariya (JP)

(*) Notice: Subject to any disclaimer, the term of this patent is extended or adjusted under 35 U.S.C. 154(b) by 298 days.

(21) Appl. No.: 17/528,338

(22) Filed: Nov. 17, 2021

(65) Prior Publication Data
US 2022/0219711 A1    Jul. 14, 2022

(30) Foreign Application Priority Data
Jan. 14, 2021    (JP) .................... 2021-004378

(51) Int. Cl.
*B60W 50/00* (2006.01)
*B60W 30/09* (2012.01)
(Continued)

(52) U.S. Cl.
CPC ........ *B60W 50/0098* (2013.01); *B60W 30/09* (2013.01); *B60W 30/12* (2013.01);
(Continued)

(58) Field of Classification Search
CPC .... G06F 2209/035; B60W 2050/0297; B60W 50/035; B60W 50/0098; B60W 60/001;
(Continued)

(56) References Cited

U.S. PATENT DOCUMENTS

| 2011/0066344 | A1* | 3/2011 | Niwa | ............... B60W 10/184 |
| | | | | 701/70 |
| 2015/0291216 | A1 | 10/2015 | Sato | |

(Continued)

FOREIGN PATENT DOCUMENTS

| JP | 2017-224172 A | 12/2017 |
| JP | 2020-032894 A | 3/2020 |

(Continued)

OTHER PUBLICATIONS

Yu-Chen, L., Chun-Liang, L., Shih-Ting, H., & Cheng-Hsuan Kuo. (2021). Implementation of an autonomous overtaking system based on time to lane crossing estimation and model predictive control. Electronics, 10(18), 2293. doi:http://dx.doi.org/10.3390/electronics10182293 (Year: 2021).*

*Primary Examiner* — Christian Chace
*Assistant Examiner* — Katherine Marie Fitzharris
(74) *Attorney, Agent, or Firm* — Oliff PLC

(57) ABSTRACT

A control device to be mounted on a vehicle includes a memory configured to store information related to priority levels of a plurality of applications that implements driving assistance functions and a processor. The processor is configured to receive, from the applications, application requests and identifiers that identify the respective applications. The processor is configured to arbitrate a plurality of the application requests based on the information and the identifiers. The processor is configured to output a request to an actuator based on a result of arbitration of the application requests.

10 Claims, 5 Drawing Sheets

| PRIORITY LEVEL | APPLICATION ID | APPLICATION | FUNCTION |
|---|---|---|---|
| 1 | | COLLISION AVOIDANCE ASSISTANCE | — |
| 2 | | AUTONOMOUS DRIVING (LEVEL 4) | EM |
| 3 | | | AD |
| 4 | | AUTONOMOUS DRIVING (LEVEL 3) | EM |
| 5 | | | AD |
| 6 | | AUTOMATIC PARKING | — |
| 7 | | LANE DEVIATION WARNING | — |
| 8 | | LANE KEEPING ASSISTANCE | — |
| 9 | | PEDESTRIAN RISK AVOIDANCE | — |
| 10 | | STEERING WHEEL OPERATION GUIDANCE | — |
| 11 | | SELF-TRAVELING TRANSPORT | — |

(51) Int. Cl.
  *B60W 30/12*      (2020.01)
  *B60W 60/00*      (2020.01)
  *G06F 9/445*      (2018.01)

(52) U.S. Cl.
  CPC ........... *B60W 60/001* (2020.02); *G06F 9/445* (2013.01); *B60W 2050/0094* (2013.01); *B60W 2520/12* (2013.01)

(58) Field of Classification Search
  CPC ................ B60W 30/09; B60W 30/12; B60W 2050/0094; B60W 2520/12; G06G 9/445
  USPC ........................................................ 701/27
  See application file for complete search history.

(56) References Cited

U.S. PATENT DOCUMENTS

| | | | |
|---|---|---|---|
| 2017/0297568 A1* | 10/2017 | Kentley | B60W 60/0027 |
| 2019/0291728 A1* | 9/2019 | Shalev-Shwartz | B60W 40/105 |
| 2020/0070849 A1 | 3/2020 | Suzuki et al. | |
| 2021/0163026 A1 | 6/2021 | Ochida et al. | |

FOREIGN PATENT DOCUMENTS

| | | |
|---|---|---|
| WO | 2014/083649 A1 | 6/2014 |
| WO | 2018/220811 A1 | 12/2018 |

\* cited by examiner

FIG. 2

| PRIORITY LEVEL | APPLICATION ID | APPLICATION | FUNCTION |
|---|---|---|---|
| 1 | | COLLISION AVOIDANCE ASSISTANCE | — |
| 2 | | AUTONOMOUS DRIVING (LEVEL 4) | EM |
| 3 | | | AD |
| 4 | | AUTONOMOUS DRIVING (LEVEL 3) | EM |
| 5 | | | AD |
| 6 | | AUTOMATIC PARKING | — |
| 7 | | LANE DEVIATION WARNING | — |
| 8 | | LANE KEEPING ASSISTANCE | — |
| 9 | | PEDESTRIAN RISK AVOIDANCE | — |
| 10 | | STEERING WHEEL OPERATION GUIDANCE | — |
| 11 | | SELF-TRAVELING TRANSPORT | — |

FIG. 3

< PRIORITY CRITERIA >

| PRIORITY FACTOR | DESCRIPTION OF APPLICATION |
|---|---|
| 1 | APPLICATIONS DEDICATED TO EMERGENCY AVOIDANCE |
| 2 | APPLICATIONS WITHOUT USER INTERVENTION |
| 3 | APPLICATIONS THAT COMPLY WITH APPLICATION-SIDE REQUESTS (EXCLUDING 1 AND 2) |
| 4 | APPLICATIONS THAT DO NOT OPERATE ON PUBLIC ROADS (ONLY IN FACTORY) |

< DETERMINATION CRITERIA FOR APPLICATION CONFLICT >

| DETERMINATION ORDER | STATUS | SELECTION |
|---|---|---|
| A-1 | PRIORITY FACTORS ARE SAME | DESCENDING ORDER OF CONTROL RANGE VELOCITY |
| A-2 | CONTROL RANGE VELOCITIES ARE SAME | DESCENDING ORDER OF SAFETY PHASE (RANGE GUARANTEED BY APPLICATION) |

< DETERMINATION CRITERION FOR MULTIPLE FUNCTIONS >

| DETERMINATION ORDER | STATUS | SELECTION |
|---|---|---|
| B-1 | ONE APPLICATION HAS MULTIPLE FUNCTIONS | DESCENDING ORDER OF PRIORITY OF SAFETY RESPONSE AND CONTROLLABILITY |

FIG. 4

| APPLICATION ID | APPLICATION | FUNCTION |
|---|---|---|
| | COLLISION AVOIDANCE ASSISTANCE | — |
| | LANE DEVIATION WARNING | — |
| | LANE KEEPING ASSISTANCE | — |
| | PEDESTRIAN RISK AVOIDANCE | — |
| | STEERING WHEEL OPERATION GUIDANCE | — |
| | AUTOMATIC PARKING | — |
| | AUTONOMOUS DRIVING (LEVEL 4) | EM |
| | | AD |
| | AUTONOMOUS DRIVING (LEVEL 3) | EM |
| | | AD |
| | SELF-TRAVELING TRANSPORT | — |

FIG. 5

| PRIORITY LEVEL | APPLICATION ID | APPLICATION | FUNCTION |
|---|---|---|---|
| 1 | | COLLISION AVOIDANCE ASSISTANCE | — |
| 2 | | AUTOMATIC PARKING | — |
| 3 | | AUTONOMOUS DRIVING (LEVEL 4) | EM |
| 4 | | | AD |
| 5 | | AUTONOMOUS DRIVING (LEVEL 3) | EM |
| 6 | | | AD |
| 7 | | LANE DEVIATION WARNING | — |
| 8 | | LANE KEEPING ASSISTANCE | — |
| 9 | | PEDESTRIAN RISK AVOIDANCE | — |
| 10 | | STEERING WHEEL OPERATION GUIDANCE | — |
| 11 | | SELF-TRAVELING TRANSPORT | — | ary
CONTROL DEVICE FOR VEHICLE, MANAGER, METHOD, NON-TRANSITORY STORAGE MEDIUM, AND VEHICLE

CROSS-REFERENCE TO RELATED APPLICATION

This application claims priority to Japanese Patent Application No. 2021-004378 filed on Jan. 14, 2021, incorporated herein by reference in its entirety.

BACKGROUND

1. Technical Field

The present disclosure relates to a control device to be mounted on a vehicle, a manager, a method, a non-transitory storage medium, and a vehicle.

2. Description of Related Art

In recent years, a plurality of applications that implements driving assistance functions (autonomous driving, automatic parking, etc.) has been installed in vehicles. Japanese Unexamined Patent Application Publication No. 2020-032894 (JP 2020-032894 A) discloses a control device that receives requests output from the applications (hereinafter referred to as "application requests"), arbitrates the plurality of received application requests, and outputs a request to drive an actuator (steering system, braking system, etc.) based on an arbitration result.

SUMMARY

Since the applications that implement the driving assistance functions have operation priority levels based on the individual functions, it is desirable to fulfill the application requests related to the driving assistance functions based on the priority levels.

In the control device described in JP 2020-032894 A, however, when the application requests are received simultaneously, the actuator may be requested to fulfill an application request having a low priority level instead of an application request having a high priority level.

The present disclosure provides a control device, a manager, a method, a non-transitory storage medium, and a vehicle capable of outputting a request to an actuator to preferentially fulfill an application request having a high priority level.

A first aspect of a technology of the present disclosure relates to a control device to be mounted on a vehicle. The control device includes a memory configured to store information related to priority levels of a plurality of applications configured to implement driving assistance functions and a processor. The processor is configured to receive, from the applications, application requests and identifiers that identify the respective applications. The processor is configured to arbitrate a plurality of the application requests based on the information and the identifiers. The processor is configured to output a request to an actuator based on a result of arbitration of the application requests.

The control device of the first aspect of the technology of the present disclosure arbitrates the application requests based on the information related to the priority levels and stored in the memory. As a result, it is possible to output a request (instruction) to the actuator to preferentially fulfill an application request having a high priority level.

In the first aspect of the technology of the present disclosure, the application requests may be requests related to a lateral motion of the vehicle. In the first aspect of the technology of the present disclosure, the driving assistance functions to be implemented by the applications may include an autonomous driving function and a collision avoidance assistance function. In the information, a priority level of an application configured to implement the collision avoidance assistance function may be set higher than a priority level of an application configured to implement the autonomous driving function. In the first aspect of the technology of the present disclosure, the driving assistance functions to be implemented by the applications may further include a lane keeping assistance function. In the information, the priority level of the application configured to implement the autonomous driving function may be set higher than a priority level of an application configured to implement the lane keeping assistance function. In the first aspect of the technology of the present disclosure, the processor may be configured to change the priority levels in the information based on a condition of the vehicle or a condition of a driver, and arbitrate the application requests based on the changed priority levels.

A second aspect of the technology of the present disclosure relates to a manager including a receiver, a storage, an arbitrator, and an outputter. The receiver is configured to receive application identifications and kinematic plan requests from a plurality of devices having functions of advanced driver assistance system applications. The storage is configured to store information related to priority levels of a plurality of the application identifications. The arbitrator is configured to arbitrate a plurality of the kinematic plan requests received by the receiver based on the information. The outputter is configured to output a motion request to an actuator based on a result of arbitration performed by the arbitrator.

A third aspect of the technology of the present disclosure relates to a control method to be executed by a computer of a control device to be mounted on a vehicle. The control method includes: receiving, from a plurality of applications configured to implement driving assistance functions, application requests and identifiers that identify the respective applications; arbitrating a plurality of the application requests received in the receiving based on the identifiers and information related to priority levels of the applications and stored in a predetermined storage; and outputting a request to an actuator based on a result of arbitration in the arbitrating.

A fourth aspect of the technology of the present disclosure relates to a non-transitory storage medium storing instructions that are executable by a computer of a control device to be mounted on a vehicle and that cause the computer to perform functions. The functions include: receiving, from a plurality of applications configured to implement driving assistance functions, application requests and identifiers that identify the respective applications; arbitrating a plurality of the application requests received in the receiving based on the identifiers and information related to priority levels of the applications and stored in a predetermined storage; and outputting a request to an actuator based on a result of arbitration in the arbitrating.

A fifth aspect of the technology of the present disclosure relates to a vehicle including the control device of the first aspect of the technology of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 illustrates an example of application priority level information stored in a storage;

FIG. 3 illustrates examples of various criteria for setting application priority levels;

FIG. 4 illustrates examples of applications and functions installed and implemented in a vehicle; and FIG. 5 illustrates an applied example of the application priority level information.

DETAILED DESCRIPTION OF EMBODIMENTS

Figure 1:
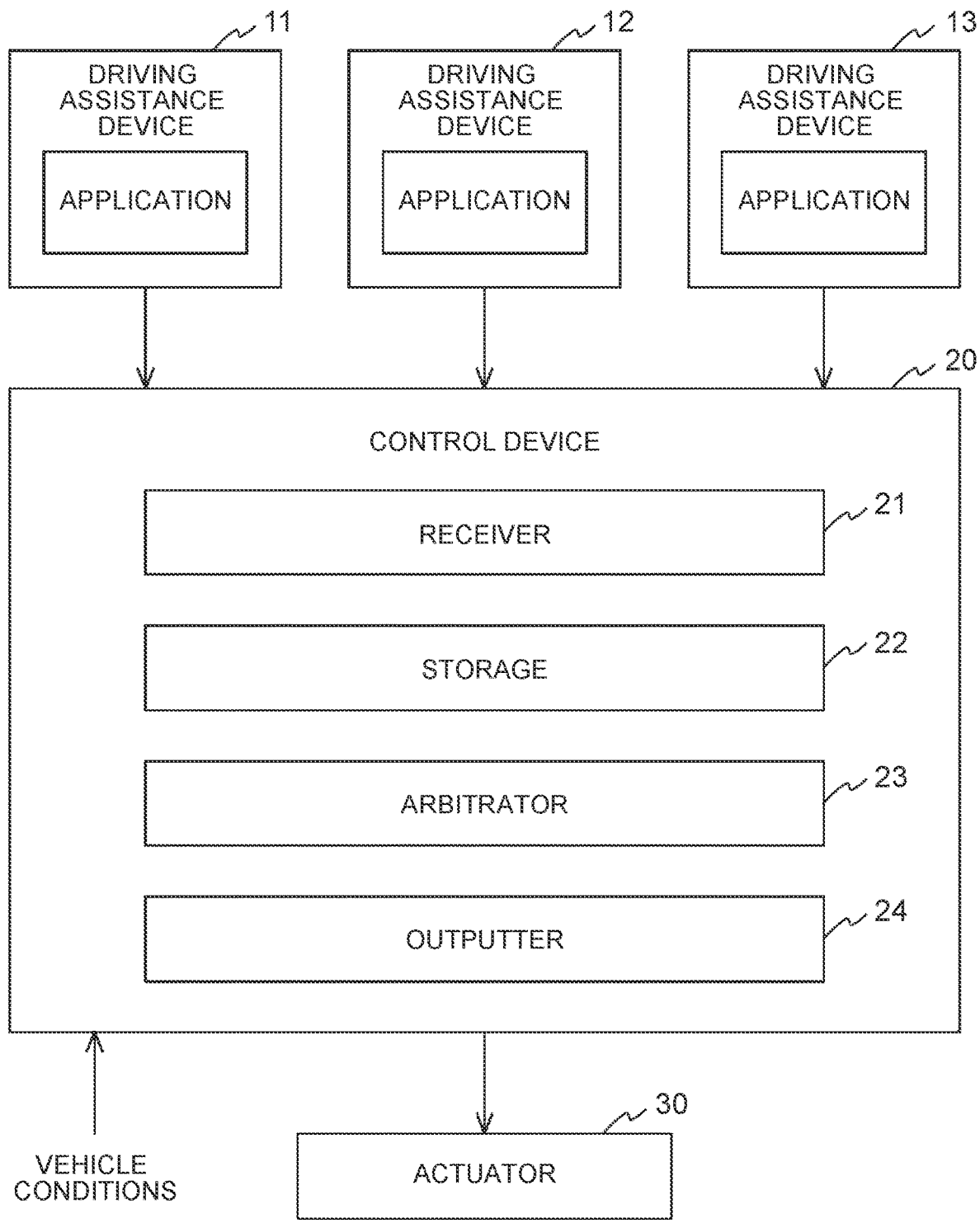
FIG. 1 is a functional block diagram of a control device and its peripheral components according to an embodiment of the present disclosure.

A control device of the present disclosure arbitrates a plurality of application requests based on a plurality of application priority levels preset in accordance with predetermined criteria. As a result, it is possible to instruct an actuator to preferentially fulfill an application request having a high priority level. An embodiment of the present disclosure will be described below in detail with reference to the drawings.

Embodiment

Configuration

FIG. 1 is a functional block diagram of a control device to be mounted on a vehicle and its peripheral components according to the embodiment of the present disclosure. The functional blocks illustrated in FIG. 1 include a plurality of driving assistance devices 11 to 13, a control device 20, and an actuator 30.

The driving assistance devices 11 to 13 execute applications installed in the individual devices to implement various functions for assisting driving of the vehicle (driving assistance functions), including at least drive control and braking control of the vehicle. Examples of the applications installed in the driving assistance devices 11 to 13 include an application that implements an autonomous driving function, an application that implements an automatic parking function, and an application that implements an advanced driver assistance system (ADAS) function. Advanced driver assistance system applications (ADAS applications) include an application that implements a collision avoidance assistance (pre-crash safety (PCS), etc.) function, an application that implements a pedestrian risk avoidance function, an application that implements a preceding vehicle following (adaptive cruise control (ACC), etc.) function for causing the vehicle to travel while keeping a constant distance from a preceding vehicle, an application that implements a lane keeping assistance (lane keeping assist (LKA), lane tracing assist (LTA), etc.) function for keeping a traveling lane, an application that implements a collision damage reduction braking (autonomous emergency braking (AEB), etc.) function for automatically applying a brake to reduce damage caused by collision, an application that implements a lane deviation warning (lane departure warning (LDW), lane departure alert (LDA), etc.) function for warning a driver about deviation from a traveling lane of the vehicle, and an application that implements a steering wheel operation guidance function.

Each of the driving assistance devices 11 to 13 outputs a request for a kinematic plan (longitudinal acceleration/deceleration, etc.) for ensuring the functionality (commercial value) of the application alone to the control device 20 as an application request based on vehicle information (recognition sensor information, etc.) acquired (input) from various sensors (not illustrated). Each of the driving assistance devices 11 to 13 also outputs an identifier (application identifications (ID)) that can uniquely identify the application that has made the request to the control device 20 together with the application request. The application ID is preset for each application.

Each of the driving assistance devices 11 to 13 is implemented by a computer such as an electronic control unit (ECU) including a processor such as a central processing unit (CPU), a memory, and an input/output interface. For example, the driving assistance devices 11 to 13 can be implemented by an autonomous driving ECU including an autonomous driving application, an automatic parking ECU including an automatic parking application, and an ADAS-ECU including an advanced driver assistance application. The number of applications installed in each of the driving assistance devices 11 to 13 is not limited to one as illustrated in FIG. 1, and may be two or more. For example, an ACC application, an LKA application, and an AEB application may be installed in one driving assistance device. The number of driving assistance devices 11 to 13 is not limited to three as illustrated in FIG. 1, and may be two or less or four or more.

The control device 20 determines details of control related to at least a lateral motion among vehicle motions based on the application request (kinematic plan request) and the application ID received from each of the driving assistance devices 11 to 13, and outputs a necessary request to the actuator 30 based on the determined details of control. The control device 20 functions as a so-called manager (ADAS-MGR, Vehicle-MGR, etc.) related to the vehicle motions or as a part of the manager, thereby controlling the vehicle motions. The control device 20 includes a receiver 21, a storage 22, an arbitrator 23, and an outputter 24.

The receiver 21 receives application requests (kinematic plan requests) and application IDs output by the applications of the driving assistance devices 11 to 13. Examples of the application request of this embodiment include a request for a steered angle (or steering angle) related to the lateral motion of the vehicle. The application requests and the application IDs received by the receiver 21 are output to the arbitrator 23.

The storage 22 stores information related to priority levels of a plurality of applications (application priority level information) including the applications installed in the driving assistance devices 11 to 13. FIG. 2 illustrates an example of the application priority level information stored in the storage 22. In the application priority level information illustrated in FIG. 2, priority levels are set for the applications (and their functions) identified by the application IDs. The application priority levels are set in accordance with predetermined criteria.

FIG. 3 illustrates examples of various criteria for setting the application priority levels. In FIG. 3, <Priority Criteria> in an upper section shows relationships between descriptions of the applications and priority factors. In the example in the upper section of FIG. 3, the priority factor is highest for applications dedicated to emergency avoidance, followed in descending order by applications without user intervention, applications that comply with application-side requests, excluding the above applications, and applications that do not operate on public roads and are used only in a factory. In FIG. 3, <Determination Criteria for Application Conflict> in a middle section shows determination criteria for selection in a case where any applications have the same priority factor. In the example in the middle section of FIG. 3, selection is preferentially made for an application having a higher vehicle velocity in a range in which control is applied (control range velocity) (A-1). When the control range velocity is also the same, selection is made in order of priority levels of safety phases (ranges guaranteed by the applications) (A-2). In FIG. 3, <Determination Criterion for Multiple Functions> in a lower section shows a determination criterion for selection in a case where one application has multiple functions. In the example in the lower section of FIG. 3, the functions are compared and selection is made in order of priority levels of safety response and controllability (B-1).

The storage 22 stores, for the target applications, the application priority levels (FIG. 2) determined in advance in accordance with the criteria illustrated in FIG. 3. The method for determining the application priority levels will be described later.

The arbitrator 23 arbitrates the application requests (kinematic plan requests) received by the receiver 21 from the driving assistance devices 11 to 13. In the arbitration, the arbitrator 23 determines the priority levels of the requesting applications based on the application IDs acquired from the driving assistance devices 11 to 13 and the application priority level information stored in the storage 22. Then, the arbitrator 23 arbitrates the application requests based on the determined application priority levels. The arbitrator 23 may determine the application priority levels based also on information indicating vehicle conditions, driver's conditions, or availability acquired from on-board devices (not illustrated).

The outputter 24 outputs a request (motion request) to the actuator 30 based on a result of the arbitration of the application requests (kinematic plan requests) in the arbitrator 23.

The actuator 30 is one of the systems (implementation systems) for fulfilling the application requests (kinematic plan requests) output by the driving assistance devices 11 to 13. Examples of the actuator 30 include an electric power steering system (EPS) when the application request is a request for the steered angle. In the example of FIG. 1, the outputter 24 outputs the request (motion request) to one actuator 30, but the number of actuators 30 may be two or more.

Priority Level Determination Process

Referring also to FIG. 4, description is given of a procedure for determining the application priority levels by the control device 20 according to this embodiment. FIG. 4 illustrates examples of target applications that may output application requests to the control device 20 among the applications installed in the vehicle.

Among 11 target applications illustrated in FIG. 4, an application having priority factor 1 is first determined in accordance with the priority criteria (upper section of FIG. 3). Among the target applications, only a collision avoidance assistance application corresponds to the application dedicated to emergency avoidance with priority factor 1. Therefore, the application ID of the collision avoidance assistance application is determined to have priority level "1".

Next, an application having priority factor 2 is determined in accordance with the priority criteria (upper section of FIG. 3). Among the target applications, a plurality of applications corresponds to the applications without user intervention and with priority factor 2. The applications are an automatic parking application, an emergency maneuver (EM) application for autonomous driving (Level 4), an autonomous driving (AD) application for autonomous driving (Level 4), an EM application for autonomous driving (Level 3), and an AD application for autonomous driving (Level 3). Therefore, selection is further made on the applications in accordance with the determination criteria for application conflict (middle section of FIG. 3). First, the applications are discriminated based on whether the control range velocity is high or low. Autonomous driving (Level 4) and autonomous driving (Level 3) operate in a wide range from low velocity to high velocity, whereas automatic parking operates only in a low-velocity range. Therefore, the applications for autonomous driving (Level 4) and autonomous driving (Level 3) are selected. Next, determination is made about the safety phases because the control range velocity is the same between autonomous driving (Level 4) and autonomous driving (Level 3). For example, according to the outline of the definition of the autonomous driving levels shown in the "Guidelines for Safety Technology of Autonomous Driving Vehicles" of the Road Transport Bureau of the Ministry of Land, Infrastructure, Transport and Tourism in Japan, the safety phase is higher in autonomous driving (Level 4) that is advanced autonomous driving than autonomous driving (Level 3) that is conditional autonomous driving. Therefore, the applications for autonomous driving (Level 4) are selected. Further, determination is made about the safety response and controllability in accordance with the determination criterion for multiple functions (lower section of FIG. 3) because the applications for autonomous driving (Level 4) have multiple functions that are "EM" and "AD". "EM" (emergency maneuver) is a function of automatically stopping a vehicle in conformity with international standards (automatically commanded steering function (ACSF) regulations), and has a higher priority level than that of "AD" (autonomous driving function) that is normal autonomous driving. Therefore, the EM application for autonomous driving (Level 4) is selected rather than the AD application for autonomous driving (Level 4). This selection is similarly made on the applications for autonomous driving (Level 3). As a result of the selection described above, the application IDs of the applications having priority factor 2 are determined to have priority levels "2" to "6" in order of the EM application for autonomous driving (Level 4), the AD application for autonomous driving (Level 4), the EM application for autonomous driving (Level 3), the AD application for autonomous driving (Level 3), and the automatic parking application.

Next, an application having priority factor 3 is determined in accordance with the priority criteria (upper section of FIG. 3). Among the target applications, a plurality of applications corresponds to the applications that comply with application-side requests with priority factor 3. The applications are a lane deviation warning application, a lane keeping assistance application, a pedestrian risk avoidance application, and a steering wheel operation guidance application. Selection is made on these applications in accordance with the order (pre-assigned priority) desired in the vehicle system. In this embodiment, the application IDs of the applications are determined to have priority levels "7" to "10" in order of the lane deviation warning application, the lane keeping assistance application, the pedestrian risk avoidance application, and the steering wheel operation guidance application.

Lastly, an application having priority factor 4 is determined in accordance with the priority criteria (upper section of FIG. 3). Among the target applications, only a transport application that operates only in a factory corresponds to the application that does not operate on public roads with priority factor 4. Therefore, the application ID of the transport application is determined to have priority level "11".

Through the procedure described above, the application priority levels are uniquely determined as illustrated in FIG. 2.

As the method for selecting the applications when the control range velocity is the same in the determination criteria for application conflict (middle section of FIG. 3), the Automotive Safety Integrity Level (ASIL) that is a risk classification defined under ISO_26262 regarding vehicle functional safety may be adopted in addition to the outline of the definition of the autonomous driving levels shown in the Guidelines for Safety Technology of Autonomous Driving Vehicles. When the ASIL is adopted, the priority level of the ASIL parameter "D" may be set highest, and the priority level of the ASIL parameter "A" may be set lowest. As another method for selecting the applications when the control range velocity is the same in the determination criteria for application conflict (middle section of FIG. 3), a priority level of an application related to suppression of power output (upper-limit application) may be set higher than a priority level of an application related to permission of power output (lower-limit application).

Applied Example 1

The application priority levels (FIG. 2) determined based on the criteria illustrated in FIG. 3 and stored in the storage 22 may temporarily be changed depending on vehicle conditions, driver's conditions, or the like.

For example, when the vehicle is in a parking lot (or has moved into the parking lot from the outside of the parking lot), it can be recognized that the vehicle will be parked. Therefore, the priority levels illustrated in FIG. 2 may temporarily be changed to, for example, priority levels illustrated in FIG. 5 to switch the priority levels between the autonomous driving and the automatic parking until determination is made that the control related to parking is completed (or halted). For example, position information of a navigation device may be used to determine whether the vehicle is in the parking lot. Whether the control related to parking is completed (or halted) may be determined when an ignition is turned OFF (IG-OFF), the shift position is a parking (P) position, or a parking brake is applied (PKB-ON). The temporary change of the priority levels is performed except for the collision avoidance assistance application having the highest priority level. Thus, the applications can be arbitrated appropriately while keeping the safety of the vehicle.

Applied Example 2

This embodiment is directed to the example in which the application priority levels are applied when the control device 20 performs arbitration for the lateral motion among the vehicle motions. The application priority levels may also be applied when the control device 20 performs arbitration for a longitudinal motion.

For example, when the control device 20 arbitrates a plurality of applications that outputs longitudinal accelerations as application requests by selecting an application that requests a minimum longitudinal acceleration (minimum acceleration value), the application to be selected by the arbitration frequently changes in a case where a difference between the minimum acceleration value and a next smallest acceleration value is small and their magnitude relationship fluctuates. For example, when the difference between the minimum acceleration value and the next smallest acceleration value is equal to or less than a predetermined threshold (for example, 0.01 m/sec$^2$), one application may exclusively be selected based on the application priority levels.

Applied Example 3

The application requests output by the applications to the control device 20 include a request for a shift position in addition to the steered angle (or steering angle) related to the lateral motion of the vehicle and the longitudinal acceleration related to the longitudinal motion of the vehicle in the embodiment. In this case, it is also possible to determine a shift position to select based on the application priority levels.

Actions and Effects

As described above, the control device according to the embodiment of the present disclosure arbitrates the application requests based on the application priority levels preset in accordance with various predetermined criteria related to the priority levels. As a result, it is possible to output a request (instruction) to the actuator to preferentially fulfill an application request having a high priority level.

Further, the control device according to this embodiment can uniquely determine the priority levels in accordance with the criteria for setting the application priority levels in FIG. 3 even when a new function is added. For example, it is assumed that an application that implements an automatic valet parking function is newly added to the installed applications in FIG. 4. The automatic valet parking function is a function of parking a vehicle by causing the vehicle to autonomously travel in a parking lot to find an available parking space. The automatic valet parking application corresponds to the application having priority factor 2, and has a lower priority level than those of the applications for autonomous driving (Level 4) and autonomous driving (Level 3) because the automatic valet parking application operates in a low-velocity range. The velocity of automatic valet parking (about 20 km/h) is generally higher than the velocity of automatic parking (about 10 km/h). Therefore, the automatic valet parking application is uniquely determined between priority levels 5 and 6 in FIG. 2.

Although the technology of the present disclosure is described above based on the embodiment, the present disclosure can be regarded not only as the control device for a vehicle, but also as, for example, a control system including the control device and other devices, a control method to be executed by the control device including a processor and a memory, a control program, a non-transitory computer-readable storage medium storing the control program, or a vehicle including the control device.

The present disclosure is useful for a control device to be mounted on a vehicle or the like.

What is claimed is:

1. A control device to be mounted on a vehicle, the control device comprising:
a memory configured to store information related to priority levels of a plurality of applications configured to implement driving assistance functions; and
a processor configured to:
receive, from the applications, application requests and identifiers that identify the respective applications;
arbitrate a plurality of the application requests based on the information and the identifiers; and output a request to an actuator that controls a movement of the vehicle based on a result of arbitration of the application requests.

2. The control device according to claim 1, wherein the application requests are requests related to a lateral motion of the vehicle.

3. The control device according to claim 2, wherein:
the driving assistance functions to be implemented by the applications include an autonomous driving function and a collision avoidance assistance function; and
in the information, a priority level of an application configured to implement the collision avoidance assistance function is set higher than a priority level of an application configured to implement the autonomous driving function.

4. The control device according to claim 3, wherein:
the driving assistance functions to be implemented by the applications further include a lane keeping assistance function, and
in the information, the priority level of the application configured to implement the autonomous driving function is set higher than a priority level of an application configured to implement the lane keeping assistance function.

5. The control device according to claim 1, wherein the processor is configured to change the priority levels in the information based on a condition of the vehicle or a condition of a driver, and arbitrate the application requests based on the changed priority levels.

6. A manager device comprising:
a receiver configured to receive application identifications and kinematic plan requests from a plurality of devices having functions of advanced driver assistance system applications;
a storage configured to store information related to priority levels of a plurality of the application identifications;
an arbitrator configured to arbitrate a plurality of the kinematic plan requests received by the receiver based on the information; and
an outputter configured to output a motion request to an actuator that controls a movement of a vehicle based on a result of arbitration performed by the arbitrator.

7. A control method to be executed by a computer of a control device to be mounted on a vehicle, the control method comprising:
receiving, from a plurality of applications configured to implement driving assistance functions, application requests and identifiers that identify the respective applications;
arbitrating a plurality of the application requests received in the receiving based on the identifiers and information related to priority levels of the applications and stored in a predetermined storage; and
outputting a request to an actuator that controls a movement of the vehicle based on a result of arbitration in the arbitrating.

8. A non-transitory storage medium storing instructions that are executable by a computer of a control device to be mounted on a vehicle and that cause the computer to perform functions comprising:
receiving, from a plurality of applications configured to implement driving assistance functions, application requests and identifiers that identify the respective applications;
arbitrating a plurality of the application requests received in the receiving based on the identifiers and information related to priority levels of the applications and stored in a predetermined storage; and
outputting a request to an actuator that controls a movement of the vehicle based on a result of arbitration in the arbitrating.

9. A vehicle comprising the control device according to claim 1.

10. The control device according to claim 1, wherein the processor is configured to arbitrate the plurality of the application requests by preferentially selecting an application of the plurality of applications having a higher control range velocity that is a vehicle velocity in a range in which control is applied.

* * * * *